May 23, 1950          F. G. PRIETO          2,508,582
COMBUSTION ENGINE
Filed March 29, 1949
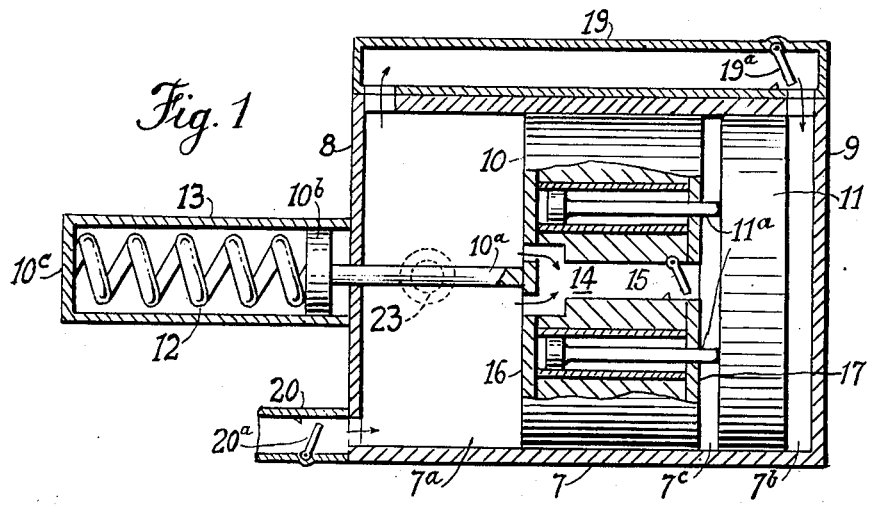
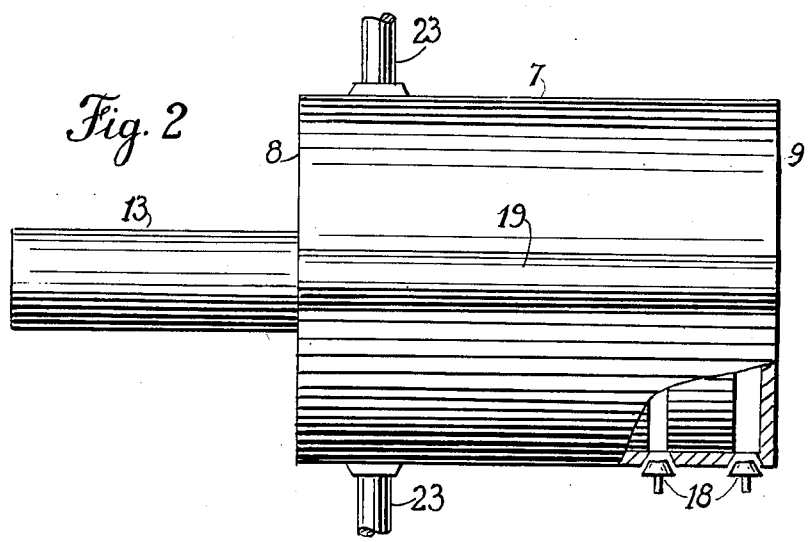
INVENTOR.
Fernando Prieto Patented May 23, 1950

2,508,582

UNITED STATES PATENT OFFICE 2,508,582

COMBUSTION ENGINE

Fernando G. Prieto, Los Angeles, Calif.

Application March 29, 1949, Serial No. 84,079

1 Claim. (Cl. 123—74)

The present invention relates to an improved two-stroke cycle internal combustion engine in which principles of reciprocating and jet engines are embodied.

The principal object of the present invention is to provide an engine of the character indicated which may be used to propel a vehicle on the ground, in the air, on water, or in water, and which can move a vehicle upward or downward vertically without the need of rotor blades or wings.

Other objects of the invention are: to provide an engine which is economical in fuel consumption, has an efficient weight to power ratio, and in which complete scavenging of its combustion chamber is effected at the end of its exhaust stroke.

The foregoing and other objects, features and advantages of the invention will be more clearly realized from the following detailed description of the structure illustrated in the accompanying drawing which shows, by way of example, an engine embodying the present invention, and in which:

Fig. 1 is a longitudinal sectional view of an engine embodying features of the invention.

Fig. 2 is a longitudinal view, partly in section, and taken at right angles to Fig. 1.

Referring to the drawings in greater detail, the engine shown comprises a cylinder 7 which is closed at its ends 8 and 9 and is provided with two pistons 10 and 11 and with a rod 10a. Said rod extends from piston 10 to engage a spring 12 which is compressable between a collar 10b in said rod and an abutment 10c formed by an extension 13 fixed at the cylinder end 8. The piston 10 is provided with a longitudinal passage or opening 14 controlled by a flap valve 15 which opens in a direction to allow a fuel charge to pass from the outer face 16 to the inner face 17 of said piston 10. Sliding bolts 11a connect the pistons for both unilateral and relative movement. Said cylinder is also provided with exhaust valves 18 for the gases of combustion of the engine, said valves being operated by conventional means (not shown) to alternately open in synchrony with the operation of the engine.

The engine structure also includes a tube 19 arranged longitudinally alongside of the cylinder defining a passage controlled by a flap valve 19a to allow the fuel charge to pass from the space 7a at the end 8 of the cylinder into the space 7b at the other end 9. The space 7a is provided with a fuel line 20 for admitting a fuel charge to the cylinder by displacing a back pressure valve 20a in said line.

The engine is preferably placed horizontally with the cylinder end 9 forward and attached to a vehicle which it propels by means of an axle 23 about which the engine may rotate.

The operation of the engine is as follows:

During the in-stroke of the piston 10, in a direction toward the cylinder end 9, a fuel charge is drawn into the space 7a, and said piston, coming into contact with the piston 11, compresses a fuel charge which had previously been displaced into the combustion chamber formed in the space 7b between the piston 11 and the cylinder end 9. The compressed fuel charge is ignited by a suitable spark or other firing means (not shown). The resulting gas expansion while exerting a pressure on the cylinder end 9 also causes the out-stroke to begin by propelling both pistons 10 and 11 outwardly toward cylinder end 8. The piston 11 receives its moving force directly from the expanding gases and the piston 10 receives its thrust by direct contact with the piston 11. During said out-stroke, the fuel charge in space 7a will, in turn, be compressed, said pressure automatically closing the fuel valve 20a. This pressure becomes a force that, through passage 14, will open the valve 15 of the piston 10 so that the fuel charge will pass through the passage 14 into a space 7c between the two pistons 10 and 11. The piston 11, instead of continuing to follow the outward movement of the piston 10, is gradually slowed up and finally reverses its movement. Such movement is caused by both the incoming fuel charge into space 7c and the gradual loss of force of the fully expanded gases of the combustion in chamber 7b. During the next in-stroke of the piston 10, a new fuel charge is drawn into the space 7a and said piston compresses the fuel charge in the space 7c. This compressed fuel charge, in turn, acts on the piston 11 to propel said piston against the cylinder end 9 so that the combustion chamber 7b is completely exhausted. The space 7c now becomes the combustion chamber. Upon ignition of this fuel charge, the new out-stroke begins. Again, the expanding gases of combustion exert a pressure on the cylinder end 9 through the piston 11 which is in contact with said cylinder end. The piston 10, during a part of its moving outwardly, pulls the piston 11 by means of the bolts 11a and then the fuel charge in the space 7a passes through the tube 19 into the space 7b which again becomes the combustion chamber, and the above described operation is repeated.

It will be evident that upon each explosion in the combustion chamber of the cylinder 7, the cylinder end 9 is subjected to either direct pressure of the expanding gases in space 7b or to the pressure in space 7c (as applied through piston 11) to produce a thrust that will move the vehicle forward. This thrust is a reactive force applied without any gear, that is, directly on the cylinder end 9 and, since the spring 12 will be strong enough only to reciprocate the piston 10, said piston will run at a very great speed, the feeding of fuel into the combustion chamber approaching a continuous application of energy.

Only the essentials of my engine structure have been disclosed and it is obvious that skilled persons can readily incorporate such attending instrumentalities that may be needed to complete the structure. Further, many changes may be made in the construction and arrangement of the parts without departing from the spirit and scope of the invention as claimed. I, therefore, desire to reserve to myself such variations that fall within the scope of the appended claim.

I claim:

A two-stroke cycle internal combustion engine comprising a cylinder having opposed ends, a first piston in said cylinder and having an opening therethrough, a valve in said opening controlling flow through the opening in one direction only, a spring disposed at one end of said cylinder, an extension on said cylinder end and having an abutment for one end of said spring, means extending from the piston through said cylinder end in a direction toward said spring and in abutment with the other end of said spring, said spring thereby being adapted to be compressed between said abutments, a second piston in said cylinder on that side of the first piston that is opposite to the extension thereof, means inter-connecting the pistons for both relative movement and movement together, a passage connecting the opposite ends of the cylinder, a valve in said passage, the valve in the first piston being arranged to open to flow only in a direction toward the second piston, the valve in the passage being adapted to open to flow alternately with the mentioned valve during each cycle of the engine, an axle, and means connecting the cylinder of said engine to said axle whereby said engine is adapted to turn about the axle.

FERNANDO G. PRIETO.

REFERENCES CITED

The following references are of record in the file of this patent:

UNITED STATES PATENTS

| Number | Name | Date |
| --- | --- | --- |
| 2,463,308 | Prieto | Mar. 1, 1949 |